June 11, 1940.   A. J. CORNELISSEN   2,203,774
VEHICLE WHEEL
Filed April 28, 1937   2 Sheets-Sheet 1

INVENTOR
Arnold J. Cornelissen,
BY
Beau, Brooks, Buckley & Beau.
ATTORNEYS

June 11, 1940.  A. J. CORNELISSEN  2,203,774

VEHICLE WHEEL

Filed April 28, 1937  2 Sheets-Sheet 2

INVENTOR
Arnold J. Cornelissen,
BY
Beau, Brooks, Buckley & Beau.
ATTORNEYS

Patented June 11, 1940

2,203,774

UNITED STATES PATENT OFFICE 2,203,774

VEHICLE WHEEL

Arnold J. Cornelissen, Buffalo, N. Y.

Application April 28, 1937, Serial No. 139,531

3 Claims. (Cl. 301—38)

This invention relates to wheel devices for vehicles and more particularly to vehicles of the automobile type in widespread use today.

One object of the invention is to provide an improved ventilating wheel structure for vehicles whereby friction-generated heat in the tire member and in the braking mechanism thereof may be automatically dissipated and removed from the device during operation of the wheel.

Another object of the invention is to provide an improved compound wheel structure comprising a primary wheel fitted with a conventional pneumatic tire for normal road engaging purposes, and an auxiliary wheel adapted to engage the road when the primary wheel tire is in a deflated condition.

Another object of the invention is to provide an improved vehicle wheel structure comprising an auxiliary wheel member which is adapted to support the vehicle whenever the primary wheel member becomes disabled such as by reason of a deflated tire, and means to support the vehicle in such manner that the main wheel is free to be removed for repair purposes.

The invention is exemplified in a construction comprising a conventional axle receiving hub and bearing means, said hub being provided with a radially extending flange. A conventional type of brake drum is attached to the hub flange, and an auxiliary wheel member is either detachably or permanently attached to the hub flange in radially extending relation thereabout. The auxiliary wheel is provided with a road engaging tire portion, a central body portion, and intermediately disposed projections extending laterally from the body portion to provide air propelling means when the auxiliary wheel is being rotated, for the purpose of dispersing heat from the device. A primary wheel provided with a normal road engaging tire of the pneumatic type is fitted against adjacent portions of the auxiliary wheel for connection to the hub flange, while the major portion of the primary wheel member is spaced from the body portion of the auxiliary wheel to provide room for the circulation of air therebetween. The connection of the primary wheel member to the hub flange is detachably made by means of conventional studs or the like in such manner that the primary wheel and auxiliary wheel are firmly interlocked to the hub flange, and yet that the primary wheel may be removed for repair purposes without disturbing the connection of the auxiliary wheel to the hub. The auxiliary wheel tire is of such diameter as to adapt the wheel to sustain the vehicle whenever the primary wheel tire is in a deflated condition or removed from the vehicle. Preferably, openings are provided through the body portion of the auxiliary wheel and the primary wheel to provide conduits for air in connection with the heat dispersing process.

Figure 1:
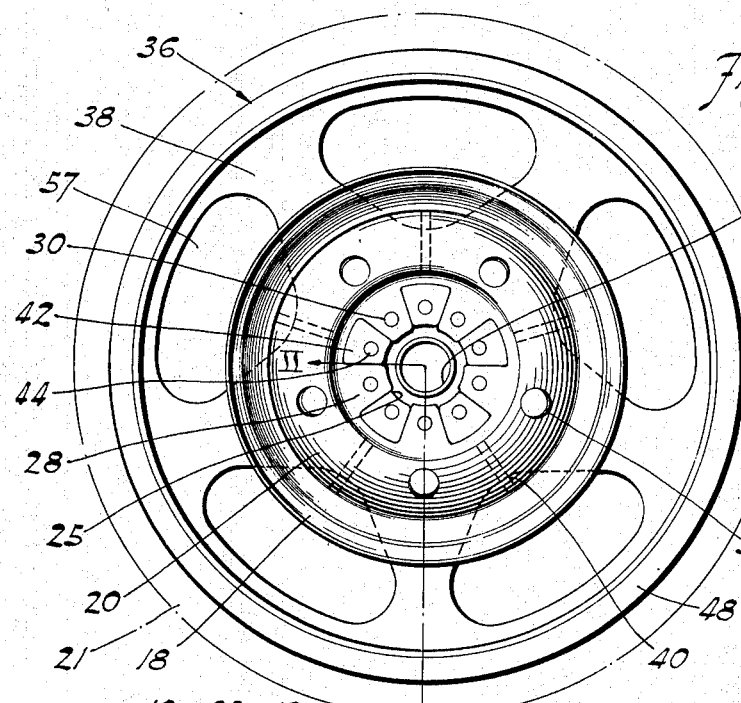
Fig. 1 is an elevation of a wheel embodying the invention.

In practicing the invention a hub member 10 fitted with conventional bearing means (not shown) for mounting upon the axle of a vehicle, is provided with an outstanding annular flange 12 and a brake drum 14. The brake drum 14 comprises an outer circumferential braking ring 15 and an annular side plate portion 16, the central marginal portion of which is adapted for rigid connection to the hub flange 12 in any conventional manner, as by welding or bolting. The plate 16 is in the general shape of a frusto-cone, for purposes of offsetting the braking ring 15 from the plane of the flange 12. A primary wheel rim 18 of conventional type is supported upon the hub 10 by means of an intermediate plate or body portion 20 of the disc type for mounting a conventional road engaging tire 21 of the pneumatic type. An annular shoulder 22 is provided on the plate 20 to retain a hub cap member 24 in position thereon. The wheel plate 20 is provided with a central hub receiving opening 25.

Figure 2:
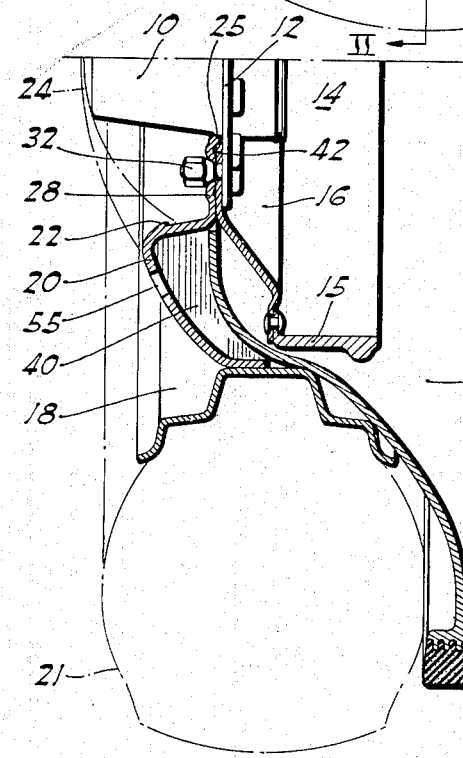
Fig. 2 is a partial section, on a larger scale, taken along the line II of Fig. 1.

In the form of the invention shown in Figs. 1 and 2 the marginal portion of the plate 20 adjacent the opening 25 is provided with spaced inwardly extending connection members 28 which are adapted to lie adjacent the hub flange 12. The members 28 are provided with openings 30 to receive studs 32 for detachably connecting the wheel 20 to the flange 12 in operating position thereon.

An auxiliary wheel 36, comprising a deformed disc-like body member 38 and laterally extending gusset or vane members 40 is centrally bored for mounting about the hub 10, and the central marginal portion of the body member 38 is provided with inwardly extending fingers 42 adapted for connection to the flange 12. The fingers 42 are so shaped as to be adapted to interlock with the connection members 28 of the primary wheel 20 and to reside against the flange 12 and between the members 28. Thus the fingers 42 of the auxiliary wheel 36 and the members 28 of the primary wheel 20 provide interengaging means which support the two wheel members against lateral relative movement therebetween. The fingers 42 of the auxiliary wheel are each provided with openings 44 to receive studs 46 for attaching the auxiliary wheel to the hub flange 12. A tire 48 for the auxiliary wheel 36 is provided of outside diameter smaller than that of the tire 21 of the primary wheel when the latter is in an inflated condition; and the auxiliary wheel tire 48 is of such diameter that it will engage the road whenever the primary wheel tire 21 becomes deflated, without permitting the primary wheel tire 21 to be pressed in an injurious manner between the rim 18 and the roadway.

Figure 5:
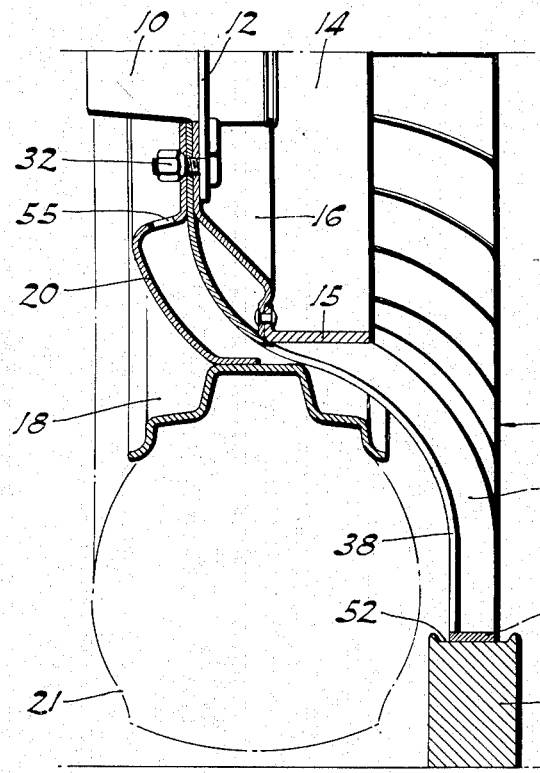
Fig. 5 is a view similar to Figs. 2 and 3 of another form of the invention, showing a portion of the wheel structure mounting a raised block.
Figure 6:
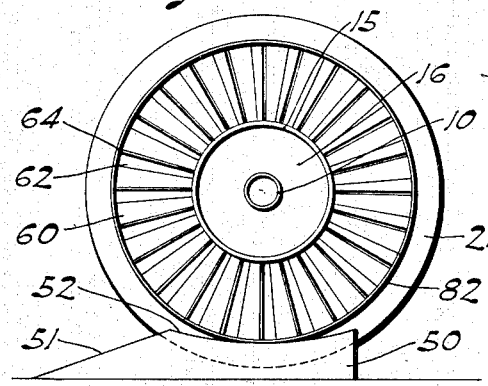
Fig. 6 is an elevation of the structure shown in Fig. 5.

As illustrated in Figs. 5 and 6, a raising block 50 may be positioned under the auxiliary wheel by simply driving the vehicle in such manner that the auxiliary wheel travels up an inclined portion 51 of the block and thence into a cradled position on the arcuate saddle portion 52 of the block 50. In this position the entire structure is supported in an elevated manner whereby it is convenient to remove the primary wheel 20 from the hub 10 by disconnecting the studs 32 from the flange 12 and withdrawing the wheel from the axle.

The wheel 20 is preferably provided with openings 55 through the body portion thereof, and likewise openings 57 through the body portion 38 of the auxiliary wheel 36 are provided. Laterally extending baffle plates 40 are disposed in radially spaced relation about the auxiliary wheel 36 to provide air propelling means for circulating air through the openings 55 and 57 and between the primary wheel 20 and the brake drum 14 for heat dispersing purposes. The baffle plates 40 also serve to brace the primary and auxiliary wheels against lateral relative motion, thus strengthening the assembled device when in operative relation.

Figure 4:
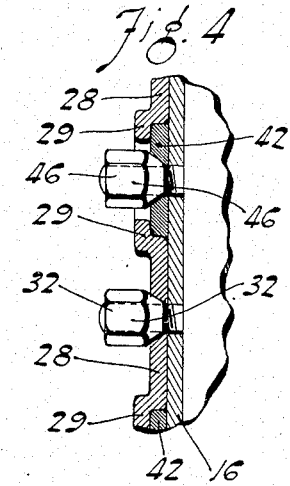
Fig. 4 is a section, on a larger scale, taken substantially along line IV—IV of Fig. 3.
Figure 3:
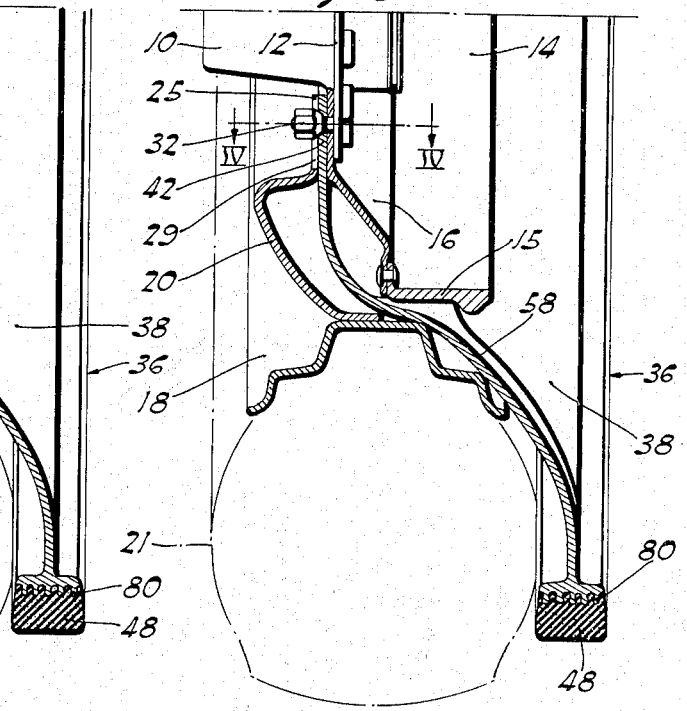
Fig. 3 is a section, similar to Fig. 2 of another form of the invention.

Figs. 3 and 4 illustrate a modified form of the construction shown in Figs. 1 and 2 in which the connection members 28 of the primary wheel are provided with deformed edge portions 29 adapted to overlap the adjacent edge portions of the fingers 42 of the auxiliary wheel, when in assembled relation upon the hub. This construction provides an extremely rigid interconnection between the primary and auxiliary wheels whereby they are braced against lateral displacement, without interfering with the ready detachment of the primary wheel when desired. Fig. 3 also illustrates the provision of gusset members 58 arranged radially of the auxiliary wheel and extending laterally from intermediate portions thereof and adapted to bear against the outer circumferential surface of the brake drum ring 15. The gusset members 58 are arranged at spaced intervals upon the auxiliary wheel, and function to brace the auxiliary wheel 36 and the brake drum 14 against relative movement. The gusset members 58 also function as air propelling means, upon rotation of the wheel device, to cause air to circulate between the primary wheel 20 and the brake drum 14.

Figure 7:
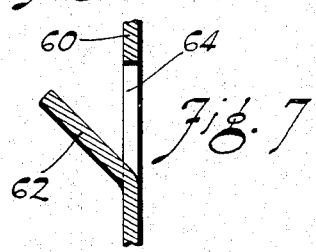
Fig. 7 is an enlarged view of a detail of the construction shown in Figs. 5 and 6.

Figs. 5, 6 and 7 illustrate another form of auxiliary wheel construction wherein gusset members are arranged radially of the auxiliary wheel and extend laterally between the confines of the rim portion 82 of the auxiliary wheel and the circumferential surface of the brake drum ring 15. In this form, the auxiliary wheel and gusset construction is illustrated as being formed from a plate of sheet material with alternate spaced spokes 60 and struck-out portions 62 which extend in inclined lateral relation to provide bracing gussets and air propelling means. Thus upon rotation of the device, the inclined gusset portions 62 operate as fan blades to displace air adjacent thereto and to set up a movement of air through the open spaces 64 between the spokes 60. Thus rotation of the device in one direction will cause air to be driven into the device through the openings 55 in the primary wheel and to be dispersed through the openings 64 between the spokes in the auxiliary wheel, having travelled between the primary wheel and the brake drum. Rotation of the device in a reverse direction will cause a reversely directed flow of air therethrough.

Figure 8:
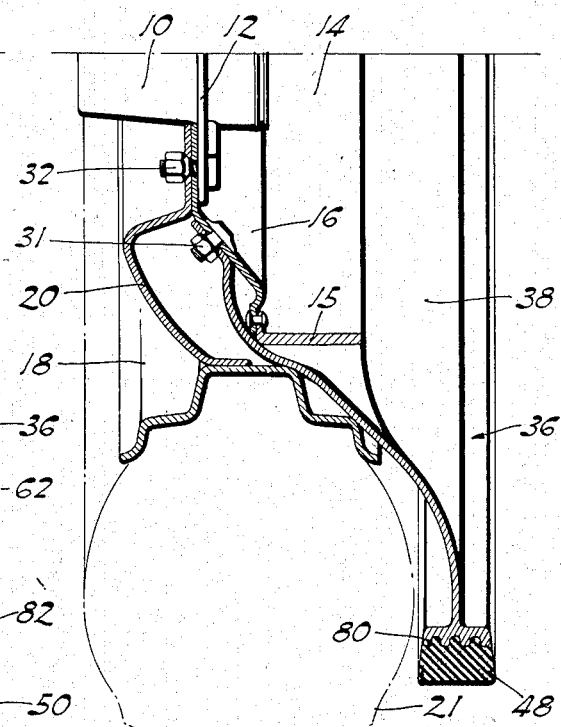
Figs. 8 and 9 are views similar to Figs. 2 and 3 of other forms of the invention.

Fig. 8 illustrates another form of the invention in which the auxiliary wheel is attached to the side plate portion 16 of the brake drum 14 by means of bolts 31 and the primary wheel 20 is adapted to be bolted directly to flange 12 by means of the studs 32 without direct contact with the auxiliary wheel 36. Thus the primary wheel 20 may be removed for repair purposes without disturbing the attachment of the auxiliary wheel to the hub.

Figure 9:
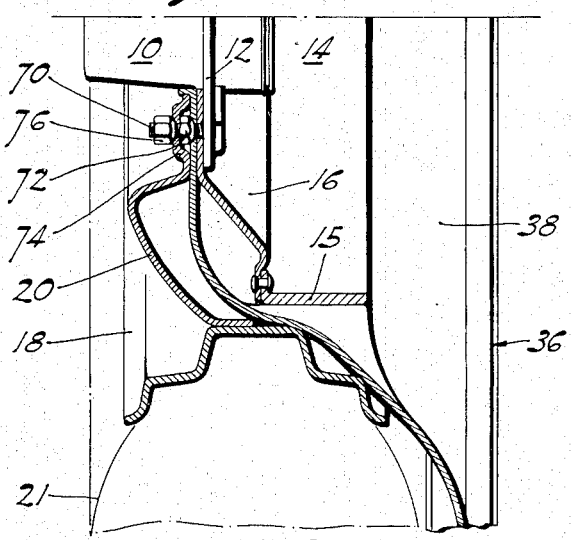

Fig. 9 illustrates another form of connection between the primary and auxiliary wheels and the hub flange 12, in which a series of studs 70 are adapted to support both the auxiliary wheel and the primary wheel thereon. A lock nut 72 is provided to fasten the auxiliary wheel in place and the primary wheel 20 is deformed at 74 adjacent its central opening to accommodate the lock nut 72. A second lock nut 76 is provided to detachably secure the primary wheel 20 upon the studs 70, and thus the primary wheel may be readily removed for repair purposes without disturbing the connection of the auxiliary wheel to the hub member.

Figs. 2, 3 and 8 illustrate the provision of tires 48 of the solid rubber type adapted to fit upon grooved rim portions 80 of the auxiliary wheel, to prevent lateral displacement therefrom. Fig. 5 illustrates a metallic tire 82 formed about the circumferential margin of the auxiliary wheel 36, and in this construction the gusset members 62 are shown extending between the tire portion 82 and the brake drum ring 15 for bracing the structure, and also for air propelling purposes.

The raising block 50 comprising an inclined portion 51 and a saddle portion 52 is adapted to support the auxiliary wheel 36 thereon at a position elevated from the roadway. When used in combination with the auxiliary wheel as shown in Figs. 5 and 6 this block provides convenient means for raising the device from the roadway to a position at which the main wheel tire is out of contact with the roadway, and thus the primary wheel may be conveniently removed from the device for repair purposes; the auxiliary wheel supporting the vehicle in the meantime.

There is thus provided a wheel device for vehicles comprising a pneumatic tire of the conventional type supported upon a primary wheel for normal road engaging purposes. The auxiliary wheel, being of lesser outside diameter than the tire of the primary wheel, rotates with the primary wheel and is normally out of contact with the roadway. In case of deflation of the primary wheel tire, the device subsides to a level at which the auxiliary tire member contacts the roadway and carries the load of the vehicle. This prevents the primary wheel tire from being mutilated by pressure between the tire rim and the roadway, and also obviates any sudden appreciable change of wheel diameter, such as would occur in the case of a tire blowout in connection with the conventional mechanism, and which would otherwise cause dangerous swerving of the vehicle when travelling at high rates of speed.

Thus the auxiliary wheel is adapted to support the vehicle for emergency purposes until such time as a service station may be reached; or the block 50 may be arranged ahead of the auxiliary wheel and the vehicle driven forwardly in such manner that the auxiliary wheel mounts the inclined portion and rests upon the saddle portion; in which position the primary wheel may be removed for repair purposes.

Although only one form of the invention has been shown and described in detail, it will be apparent to those skilled in the art that the invention is not so limited but that various changes can be made therein without departing from the spirit of the invention or from the scope of the appended claims.

I claim:

1. A vehicle wheel device comprising an axle engaging hub member, an integral normal road engaging primary wheel member having a reversely curved disc body portion supported by said hub, a brake drum supported by said hub independently of said primary wheel member and disposed substantially within the confines of said primary wheel member, an auxiliary wheel mounted upon said hub and extending between said primary wheel and said brake drum, said auxiliary wheel comprising a body portion in the general shape of a frusto-cone and a circumferential rim member disposed in a plane offset from the confines of the primary wheel, and laterally offset gusset members extending radially between the body portion of the auxiliary wheel and said brake drum to transmit load forces from said auxiliary wheel to said brake drum, and to centrifugally motivate air adjacent said brake drum upon rotation of the wheel device.

2. A vehicle wheel device comprising an axle engaging hub member, an integral normal road engaging primary wheel member having a reversely curved disc body portion supported by said hub, a brake drum supported by said hub independently of said primary wheel member and disposed substantially within the confines of said primary wheel member, an auxiliary wheel mounted upon said hub and extending between said primary wheel and said brake drum, said auxiliary wheel comprising a body portion in the general shape of a frusto-cone and a circumferential rim member disposed in a plane offset from the confines of the primary wheel, and gusset members extending radially and axially between the auxiliary wheel and the primary wheel to provide stress-reducing members therebetween and to centrifugally motivate air adjacent said primary wheel member upon rotation of said wheel device.

3. A vehicle wheel device comprising an axle engaging hub member formed with an axially extending bearing housing and a radially extending flange, a primary wheel formed with a central opening to receive said bearing housing and a marginal flange engaging portion comprising a plurality of spaced fingers adapted to bear against said flange, an auxiliary wheel provided with a rim for road engagement whenever said primary wheel is in inoperable condition, said auxiliary wheel being provided with a housing receiving opening and a plurality of spaced fingers adjacent thereto adapted to fit between the fingers of said primary wheel and to bear against said flange, means engaging said flange and said fingers of said primary wheel for detachably maintaining said primary wheel in operable relation upon said hub, and means engaging said flange and said fingers of said auxiliary wheel for detachably maintaining said auxiliary wheel in operable relation upon said hub, said fingers of said primary wheel being provided with edge portions overlapping marginal portions of said auxiliary wheel fingers.

ARNOLD J. CORNELISSEN.